US008594815B2

(12) United States Patent
Konetski et al.

(10) Patent No.: US 8,594,815 B2
(45) Date of Patent: Nov. 26, 2013

(54) SPEAKER MANAGEMENT METHODS AND SYSTEMS

(75) Inventors: David Konetski, Austin, TX (US); Doug Peeler, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 896 days.

(21) Appl. No.: 12/412,508

(22) Filed: Mar. 27, 2009

(65) Prior Publication Data

US 2010/0249960 A1 Sep. 30, 2010

(51) Int. Cl.
*G06F 17/00* (2006.01)

(52) U.S. Cl.
USPC ........ 700/94

(58) Field of Classification Search
USPC ........ 700/94
See application file for complete search history.

(56) References Cited

U.S. PATENT DOCUMENTS

| | | | | |
|---|---|---|---|---|
| 6,674,864 | B1 | 1/2004 | Kitamura | |
| 6,798,889 | B1 | 9/2004 | Dicker et al. | |
| 7,031,476 | B1 * | 4/2006 | Chrisop et al. | 381/77 |
| 7,069,219 | B2 | 6/2006 | Meyer et al. | |
| 7,613,862 | B2 * | 11/2009 | Mihai | 710/300 |
| 7,716,382 | B2 * | 5/2010 | Smith et al. | 710/8 |
| 7,805,210 | B2 * | 9/2010 | Cucos et al. | 700/94 |
| 8,046,093 | B2 * | 10/2011 | Yuen et al. | 700/94 |
| 2006/0016324 | A1 | 1/2006 | Hsieh | |
| 2008/0015718 | A1 * | 1/2008 | Yoneda et al. | 700/94 |

FOREIGN PATENT DOCUMENTS

WO WO 2007/110477 A1 3/2007

* cited by examiner

*Primary Examiner* — Andrew C Flanders
(74) *Attorney, Agent, or Firm* — Baker Botts L.L.P.

(57) ABSTRACT

A method is provided for providing speaker management. The method may include initializing an information handling system (IHS) and initializing an external speaker coupled to the IHS. The external speaker may have a device identifier (ID) associated with it. Therefore, the method may also include receiving the device ID and filtering audio data sent to the external speaker. automatically loading an audio driver corresponding to the device ID. Using speaker compensation parameters associated with the audio driver, the method may include

19 Claims, 4 Drawing Sheets

SPEAKER MANAGEMENT METHODS AND SYSTEMS

TECHNICAL FIELD

The present disclosure relates generally to the field of information handling systems, and more specifically, a speaker management framework.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some IHSs, a speaker may be desired to output sound derived from audio data generated within an IHS. For example, a user may desire to listen to music, play a movie, play a game, or engage in any other activity that requires sound output. Thus, speakers for an IHS may be designed to convert digital data from the IHS into an acoustic form audible by a user.

Furthermore, certain challenges may exist in designing a speaker for use with an IHS such as accurately reproducing source audio in the speaker while balancing the speaker's cabinet (i.e., enclosure) size. In addition, certain inherent deficiencies in transducer design may create further hindrances. As such, speaker compensation techniques have been developed to address deficiencies in speaker performance by modifying or filtering the source audio data before it is reproduced and output by the speaker. Speaker compensation may be performed by dedicated hardware in the speaker or by software methods in an IHS. Dedicated hardware may increase the cost of speakers but may enable external or standalone speakers (i.e., not embedded in an IHS) to perform speaker compensation. Alternatively, software methods of performing speaker compensation in an IHS may provide cost savings. However, software methods may require the use of significant IHS resources such as the processor and/or memory.

In order to implement software methods for speaker compensation, knowledge of the speaker type, such as the model, performance capabilities, performance requirements, and any other information may be required to appropriately compensate for the desired speaker performance. For embedded speakers, gaining such knowledge may be straightforward since the speakers may be part of the IHS itself. For external speakers, however, certain difficulties may arise since the IHS may need to be aware of various different types of external speakers. For example, when an external speaker is coupled to an IHS, the IHS may need to locate an appropriate driver or any speaker compensation parameters unique to the external speaker in order to effectively filter audio data.

Current methods addressing these issues may include providing applications that enable a user to determine appropriate drivers and/or parameters associated with the external speaker. Consequently, these applications may require the user to have knowledge of the type of speaker being employed. Other methods may include storing various drivers and parameters in a storage device. These storage devices, however, may be separate from the IHS, thereby requiring an extra component and layer of communication in managing a speaker system with an IHS.

Thus, a need exists for methods and systems for a speaker management framework to automatically identify a speaker and provide speaker compensation.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for providing speaker management. The method may include initializing an information handling system (IHS) and an external speaker coupled to the IHS. Furthermore, the method may include receiving a device identifier (ID) associated with the external speaker and automatically loading an audio driver corresponding to the device ID. Additionally, the method may include filtering audio data sent to the external speaker by applying a speaker compensation parameter associated with the audio driver.

Another aspect of the present disclosure provides for an information handling system (IHS). The IHS may include an external speaker coupled to the IHS and memory operable to store an operating system (OS). To this end, the OS may be operable to receive a device identifier (ID) associated with the external speaker and automatically load an audio driver for the external speaker based on the device ID.

A further aspect of the present disclosure provides for a method for managing an external speaker coupled to an information handling system (IHS). The method may include initializing the IHS and an external speaker, the external speaker coupled to the IHS via a direct connection. Furthermore, the method may include identifying the external speaker to the IHS and loading a custom audio driver automatically for the external speaker upon identifying the external speaker. Moreover, the custom audio driver may include a speaker compensation parameter for the external speaker. Additionally, the method may include filtering the audio data sent to the external speaker by applying the speaker compensation parameter to the audio data.

Yet another aspect of the disclosure provides a computer-readable medium having computer-executable instructions for performing a method for providing speaker management. The method may include initializing an information handling system (IHS) and an external speaker coupled to the IHS. Furthermore, the method may include receiving a device identifier (ID) associated with the external speaker and automatically loading an audio driver corresponding to the device ID. Additionally, the method may include filtering audio data sent to the external speaker by applying a speaker compensation parameter associated with the audio driver.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
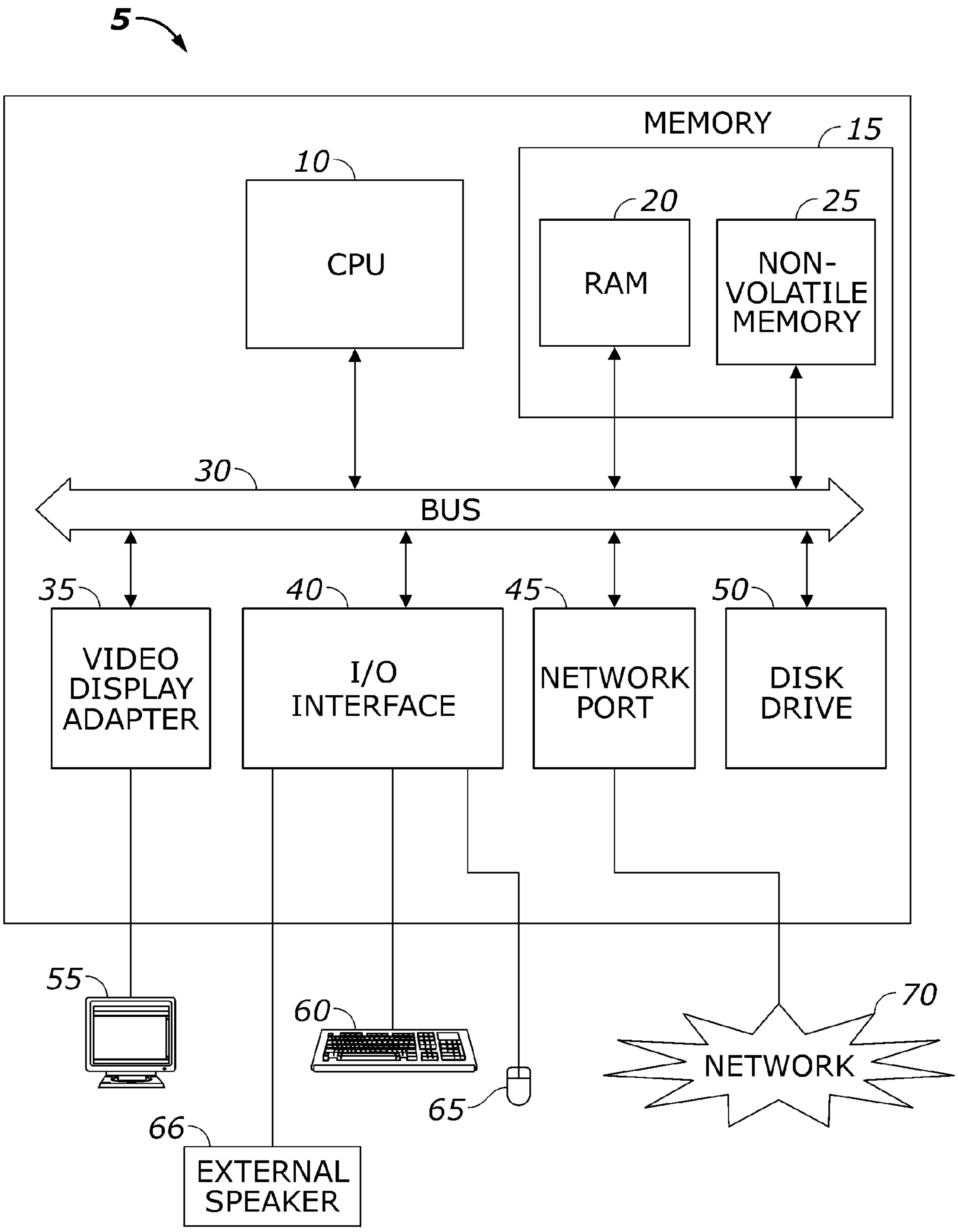
FIG. 1 represents an information handling system (IHS) in accordance with one aspect of the present disclosure.

Before the present systems and methods are described, it is to be understood that this disclosure is not limited to the particular systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This invention is not limited in its application to the details of construction and the arrangement of components set forth in the following description or illustrated in the drawings. The invention is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a speaker" refers to one or several speakers and reference to "a method of providing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55, speaker 66 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

In addition, an external speaker may be coupled to the IHS 5 via the I/O interface 40. The external speaker may be operable to receive audio data and produce sound according to audio data. In some instances, the audio data may be stored and/or manipulated as a digital signal. To this end, audio data may be generated by various applications or such as an operating system (OS), software applications, and/or the like. For example, a software application, such as a computer game, may generate audio data associated with an action within the game. Such audio data may be sent to the external speaker where sound corresponding to the audio data may be rendered. Alternately, audio data may also be stored on a storage device such as in a hard disk drive, optical drive, and/or the like. As such, the OS or a software application may read and send the audio data to the external speakers. It should be noted that various methods of generating and/or storing audio may exist and that such methods are well known in the art.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

In certain implementations of the present disclosure, a network 70 may provide an information infrastructure, including physical connections or couplings, to allow more than one IHS to communicate with each other and share information. A network 70 may also communicatively couple components of one or more IHSs. In addition to the aforementioned, the network 70 may be implemented as, or may be part of, a personal area network (PAN), metropolitan area network (MAN), wireless local area network (WLAN), virtual private network (VPN), an intranet, or any other appropriate architecture or system that facilitates the communication of signals, data, and/or messages.

Figure 2:
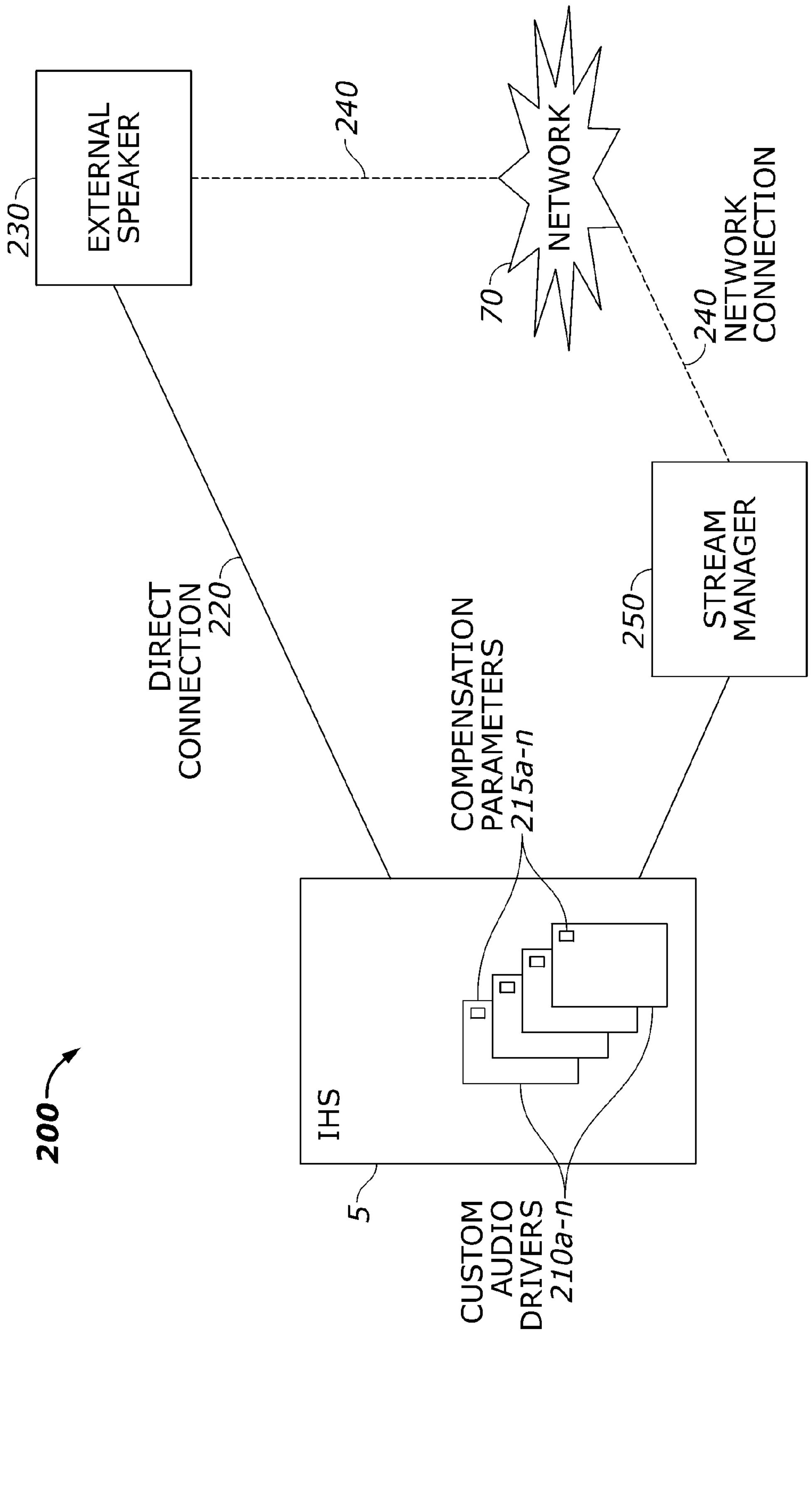
FIG. 2 represents a speaker management framework in accordance with one aspect of the present disclosure.

FIG. 2 represents a speaker management framework 200 in accordance with one aspect of the present disclosure. The speaker management framework 200 may include an IHS 5 in communication with an external speaker 230. An external speaker 230 may be a speaker not disposed within an IHS 5, which may be in contrast to an embedded speaker, which may be built within an IHS 5. The IHS 5 may communicate with the external speaker 230 through a direct connection 220 or through a network connection 240 via a stream manager 250, which are further described below.

Furthermore, the IHS 5 may include custom audio drivers 210*a-n* each corresponding to a distinct external speaker 230. The custom drivers 210*a-n* may be stored in any storage devices on the IHS 5 including, but not limited to, memory, hard disk drives, and/or optical drives. Generally, a driver may refer to a software program that enables a relatively higher-level application to interact with a hardware device. For example, a printer driver may enable the printer to interact with a relatively higher level application, such as an operating system or a word processor, which has issued a print command. Similarly, audio drivers may enable the external speaker 230 to interact with an operating system or with any other application that may send audio data to the external speaker 230.

To this end, custom audio drivers (described below) 210*a-n* may include specific speaker compensation parameter(s) 215*a-n*, depending on the external speaker 230, to provide unique speaker compensation for the external speakers 230. As used herein, speaker compensation may generally refer to modifying or filtering audio data before a speaker produces sound from the audio data. Speaker compensation may be necessary due to certain inherent deficiencies in audio transducers, which may be devices used to convert electrical signals into sound. Indeed, in certain instances, approximately one percent of electrical energy sent to a speaker may be converted into sound audible by a human, thereby highlighting the inefficiencies of transducers. Furthermore, deficiencies in the design of a cabinet, which encloses a speaker, may also exist that may distort sound emanating from the speaker. As such, inefficiencies in both transducer and cabinet design may affect or significantly degrade sound quality.

Thus, speaker compensation techniques may enable certain modifications of audio data in order to reduce such degradation. For example, speaker compensation may include parametric equalization, which may enable the control of the amplitude, center frequency, and bandwidth of audio signals. To this end, various filters, including, but not limited to infinite impulse response (IIR) filters, and finite impulse response (FIR) filters may be employed adjust the frequency bands of the audio signal. As such, frequency bands which a speaker system has difficulty reproducing may be accentuated while frequency bands in which the speaker system tends to exhibit excessive peaks in reproduction may be attenuated.

In addition, speaker compensation may be performed by either dedicated hardware in the speaker itself, or by software methods in an IHS. Dedicated hardware may provide speaker compensation in standalone speaker systems (e.g., not embedded in an IHS) but may be relatively expensive to implement. On the other hand, a relatively less expensive alternative for speaker compensation may be accomplished through software. Software methods for speaker compensation, however, may require processing power from an IHS to perform speaker compensation. Moreover, the knowledge of the type of speaker, e.g., the model, manufacturer, and/or, performance parameter(s) may also be necessary. Identifying a speaker in such a manner may be straightforward for an embedded speaker but may be more difficult to obtain for an external speaker 230.

Therefore, FIG. 2 may illustrate a speaker management framework 200 operable to identify an external speaker 230 and provide speaker compensation through software for the external speaker 230. Notably, to identify the external speaker 230 may refer to determining a unique device identifier (device ID) associated with the external speaker 230. Thus, each external speaker 230 may have a distinct device ID depending on its manufacturer and/or model. To this end, as described below, upon coupling the external speaker 230 to the IHS 5, an enumeration process may be initiated between the external speaker 230 and an OS and/or appropriately associated driver located on the IHS 5.

In one implementation of the speaker management framework 200, the IHS 5 may be coupled to the external speaker 230 though a direct connection 220. As used herein, a direct connection may refer to a connection made between the external speaker 230 and the IHS without aid from any third party device. Thus, a direct connection 220 may be established via various wired means such as the Universal Serial Bus (USB) protocol and/or the like. Alternatively, the direction connection 220 may be established via wireless protocols including, but not limited to, Bluetooth, and/or Ultra-Wide Band (UWB). For example, using the USB protocol, an external speaker 230 may be coupled to the IHS 5 by connecting a USB cable from the external speaker 230 to the IHS 5. Once both components are coupled, an enumeration process may be automatically initiated by the IHS 5.

As such, each protocol for the direct connection 220 may have its own standard enumeration process to identify the external speaker 230 to the IHS 5 (i.e., the OS of the IHS). As used within the present disclosure, an enumeration process may refer to a process by which the IHS 5 establishes communication with a peripheral device. During the enumeration process, the IHS 5 may obtain a device ID, determine information regarding the device's properties, load specific drivers for the device, and/or perform any other configuration functions associated with the device. Regarding the USB, Bluetooth, and UWB protocols, each may have its own standard enumeration process detailed within its respective specifications. Accordingly, their enumeration processes are well known in the art. Similarly, other protocols may be used for the direct connection 220 though not specifically mentioned, and each of those protocols may also have a standard enumeration process well known in the art.

Alternatively, the IHS 5 may also communicate with the external speaker 230 through a network connection 240 via a stream manager 250. A network connection may be implemented using any network protocol including, but not limited to, Ethernet, Wi-Fi, and/or any proprietary wireless protocol. A stream manager 250 may be a device operable to direct audio data from the IHS 5 to an external speaker 230 over a network 70. Under this paradigm, the external speaker 230 may not be directly connected to the IHS 5 as with a direct connection 220. Rather, the stream manager 250 may receive the audio data from the IHS 5, comprehend that the IHS 5 intends to send the audio data to the external speaker 230, and then subsequently direct the audio data to the external speaker 230 through the network 70. As such, the stream manager 250 may have access to the external speaker's 230 device ID and may provide the device ID to the IHS 5 for identification purposes.

In one implementation, the stream manager 250 may be an internal device on the IHS or a software application executed by the IHS. In other implementations, the stream manager 250 may be an external device that performs network control functions or data (e.g., audio data) routing. Examples of devices or applications that can perform the functions of the stream manager 250 include, but are not limited to, a Universal Plug and Play (UPnP) Audio and Video (AV) server or a Digital Living Network Alliance (DLNA) server.

For example, an IHS 5 may be located in a home office of a house while the external speaker may be located in the kitchen. In this instance, both the stream manager 250 and the external speaker 230 may be coupled to a network 70. Therefore, the stream manager 250 may be able to obtain the device ID of the external speaker 230 and provide it to the IHS 5. As such, the stream manager 250 may be operable to direct audio data, originating from the IHS 5, to the external speaker 230 through the network 70 so that sounds corresponding to the audio data may be produced in the kitchen. Additionally, similar to the direct connection 220 protocols, the protocols used for communicating over a network connection 240 may also each have respective standard enumeration processes by which an external speaker 230 may be identified to a device. Accordingly, these enumeration processes are also well known in the art. To this end, the external speaker may be identified by the stream manager 250, which may communicate the identification information to the IHS 5.

With respect to FIG. 2, the enumeration process may trigger the IHS 5 to automatically load a custom audio driver 210*a-n* corresponding to the external speaker 230. As such, the OS may be operable to identify the external speaker 230 as a sound device to the IHS 5, load the appropriate custom audio driver 210*a-n*, and may provide appropriate speaker compensation by applying speaker compensation parameter(s) 215*a-n* to the external speaker 230. As depicted in FIG. 2, each custom audio driver 210*a-n* may include its own configuration parameter 215*a-n* used to perform speaker compensation specific to the external speaker 230.

In another implementation, the IHS 5 may include a generic audio driver rather than multiple custom audio drivers 210*a-n*. A generic audio driver may be an audio driver that is compatible with a plurality of external speakers 230 though it may not contain appropriate speaker compensation parameter(s) 215*a-n* for each external speaker 230. To this end, the IHS 5 may also include a database containing speaker compensation parameter(s) 215*a-n* that may be used in conjunction with the generic audio driver to provide speaker compensation specific to the external speaker 230. The database may likewise be stored on any storage device within the IHS 5 including, but not limited to, hard disk drives, optical drives, and tape drives. Furthermore, the present disclosure also contemplates any combination of custom audio drivers 215*a-n*, speaker compensation parameter(s) 215*a-n*, and a generic audio driver.

It should be noted that while FIG. 2 has been described with reference to particular protocols, specifically for the direct connection 220 and network connection 240, the present disclosure is not limited to such protocols. Any protocols operable to facilitate a direct connection 220 or a network connection 240 are also contemplated within the present disclosure. Additionally, though the stream manager 250 may be illustrated as a separate component coupled to the IHS 5, in some implementations, the stream manager 250 may be embedded within the IHS 5 itself. Furthermore, as depicted by FIG. 2, it may be notable that the IHS 5 may be operable to identify the external speaker 230 and load a corresponding driver 210*a-n* without any intervention and/or input for a user. Thus, the IHS 5 may be said to provide automatic speaker identification and speaker compensation.

Figure 3:
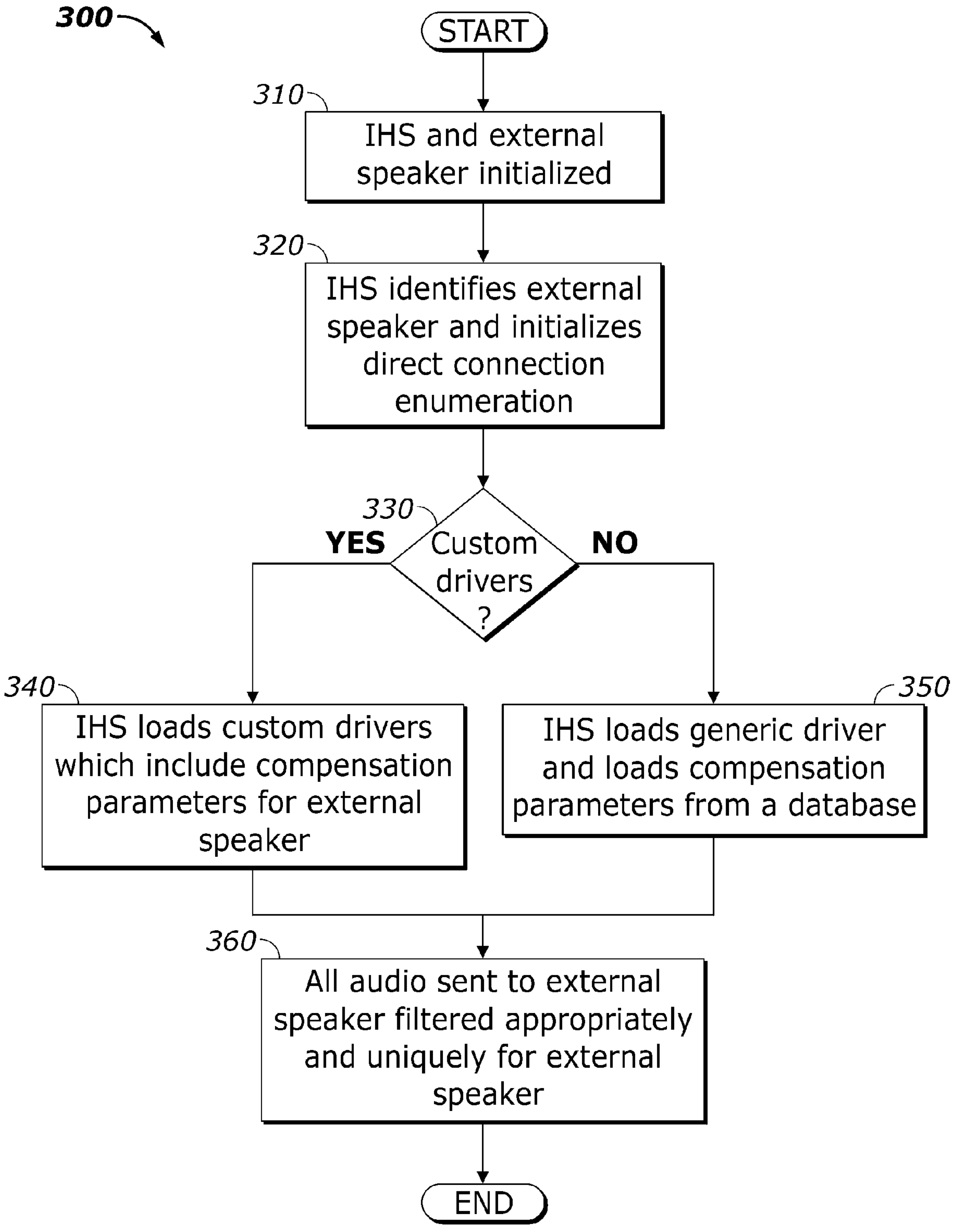
FIG. 3 provides a flow diagram of a method for providing a speaker management framework in accordance with one aspect of the present disclosure.

Referring now to FIG. 3, a flow diagram is provided illustrating a method, indicated generally at 300, for providing a speaker management framework in accordance with one aspect of the present invention. In particular, the method 300 may be directed towards an IHS in communication with an external speaker through a direct connection. To this end, the method 300 may begin in step 310 where the IHS and an external speaker are initialized. In other words, the IHS and external speaker may be powered or switched on. It should be noted that both devices need not be switched on simultaneously and can be switched on at different points in time. In one implementation, the IHS may be directly connected to the external speaker via a hard wire connection, such as a USB connection. In other implementations, wireless protocols may be employed such as Bluetooth and/or UWB for example. In another implementation, as described with reference to FIG. 4, initializing the IHS and the external speaker may comprise coupling the IHS and the external speaker to a network.

Next, in step 320, the IHS identifies the external speaker and initiates an enumeration process through the direct connection. In particular, the IHS (i.e., OS) may obtain a devices ID unique to the external speaker as part of an enumeration process previously described with reference to FIG. 2. Subsequently, a determination as to whether the IHS has custom drivers for the external speaker may be made in step 330. If the IHS includes custom drivers, the IHS may then load the custom drivers, which may already include speaker compensation parameter(s) associated with the external speaker in step 340. Otherwise, in step 350, the IHS may load a generic driver and also load the appropriate speaker compensation parameter from a database in the IHS to use with the generic driver. In step 360, after the IHS has the proper drivers and speaker compensation parameter(s) loaded, all audio data sent to the external speaker may be filtered (i.e., speaker compensation may be performed) appropriately and uniquely for the external speaker.

Figure 4:
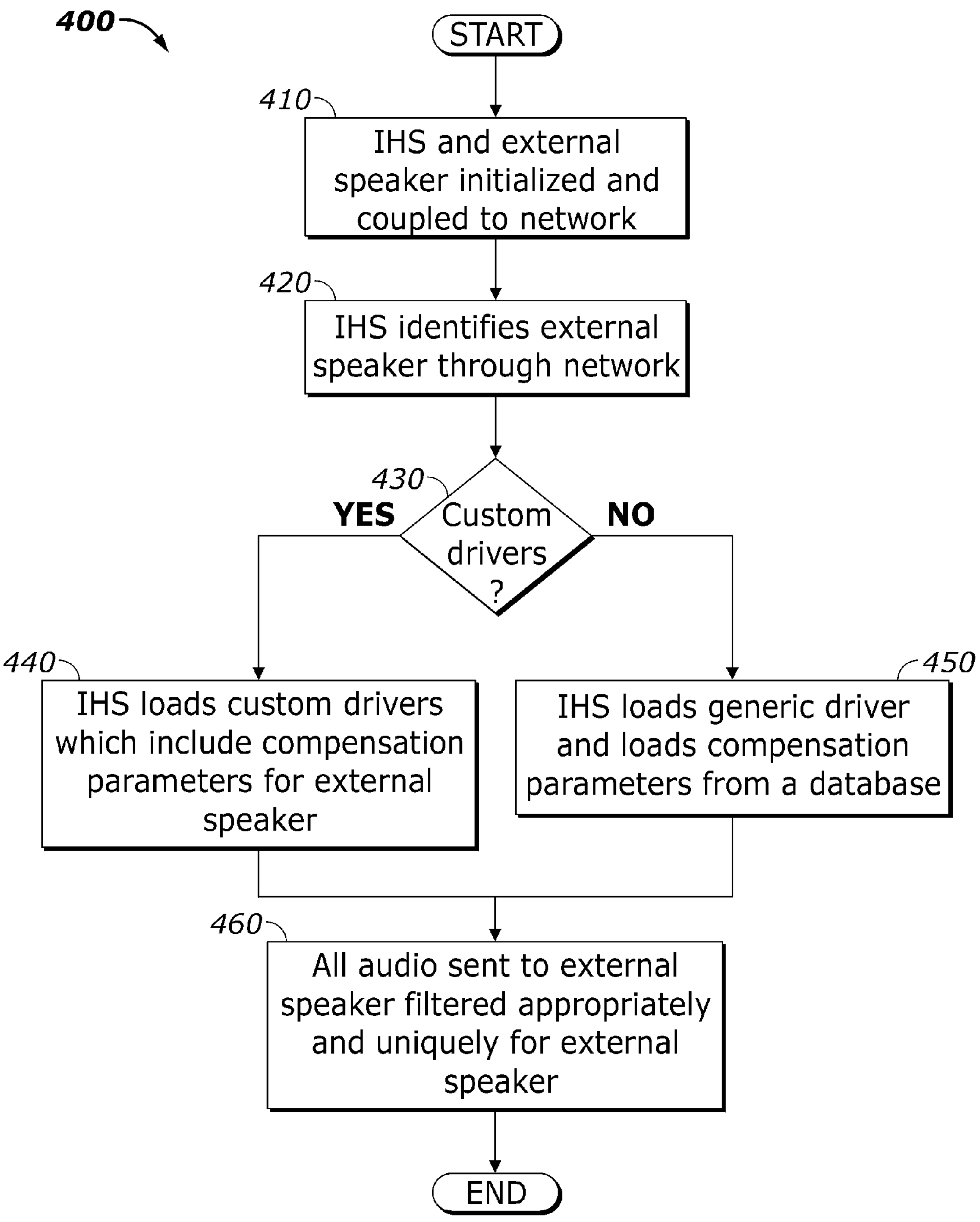
FIG. 4 provides a flow diagram of a method for providing a speaker management framework in accordance with another aspect of the present disclosure.

Turning now to FIG. 4, a flow diagram is provided that illustrates a method, indicated generally at 400, for providing a speaker management framework in accordance with another aspect of the present invention. In particular, the method 400 may be directed towards an IHS in communication with an external speaker through a network. To this end, the method 400 may begin in step 410 where the IHS and the external speaker may be initialized. In other words, the IHS and external speaker may be powered or switched on. In addition, both components may be coupled to a network as part of the initialization process. As such, various means exist for coupling devices to a network such as through the Ethernet protocol, Wi-Fi standards, and/or the like. Next, in step 420, the IHS may initiate an enumeration process through network protocols and obtain a device ID of the external speaker for identification purposes. Again, the enumeration process has been previously described with reference to FIG. 2. Furthermore, a stream manager, also coupled to the network, may be employed to facilitate communication between the IHS and the external speaker. Thus, the stream manager may also be operable to identify the external speaker and send such information to the IHS. Subsequently, a determination may be made as to whether the IHS has custom drivers for the external speaker in step 430. If the IHS includes custom drivers, the IHS may then load the custom drivers, which may already include speaker compensation parameter(s) associated with the external speaker in step 440. Otherwise, in step 450, the IHS may load a generic driver and also load the appropriate speaker compensation parameter(s) from a database to use with the generic driver. In step 460, after the IHS has the proper drivers and speaker compensation parameter(s) loaded, all audio data sent to the external speaker may be filtered (i.e., speaker compensation may be performed) appropriately and uniquely for the external speaker.

Thus, the present disclosure may provide methods and systems for implementing a speaker management framework to automatically identify an external speaker to an IHS and load appropriate drivers and/or speaker compensation parameter(s) to perform speaker compensation. Since the identification of an external speaker occurs automatically, user input may not be necessary in selecting an appropriate driver. In addition, storage of the drivers and speaker compensation parameter(s) may be located on the IHS such as in a hard drive, memory, optical disk drive, or any other storage device, which may obviate the need for additional peripheral storage devices.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for providing speaker management, the method comprising:

initializing an information handling system (IHS) and an external speaker coupled to the IHS;

receiving a device identifier (ID) associated with the external speaker;

determining presence of a custom audio driver associated with the external speaker:

if the custom audio driver is present, loading, without input of a user, the custom audio driver associated with the external speaker, wherein the custom audio driver contains a speaker compensation parameter associated with the external speaker;

if the custom audio driver is not present, loading, without input of a user, generic audio driver, and loading within the generic audio driver the speaker compensation parameter; and filtering audio data sent to the external speaker by applying the speaker compensation parameter.

2. The method of claim 1, wherein the IHS is directly connected to the external speaker.

3. The method of claim 1, wherein initializing the IHS and the external speaker comprises coupling the IHS and the external speaker to a network.

4. The method of claim 3 further comprising providing a stream manager operable to facilitate communication between the IHS and the external speaker through the network, and wherein the stream manager is further operable to provide the device ID to the IHS.

5. The method of claim 1, wherein the custom audio driver comprises the speaker compensation parameter specific to the external speaker.

6. The method of claim 2, wherein the HIS is directly connected to the external speaker via a Universal Serial Bus connection, a Bluetooth connection, or a UWB connection.

7. The method of claim 1, wherein the speaker compensation parameter is stored in a database operable to store a plurality of compensation parameters, the database located on the IHS.

8. The method of claim 7, wherein filtering the audio data comprises loading the speaker compensation parameter from the database and applying the speaker compensation parameter with the generic audio driver to the audio data, wherein the speaker compensation parameter is specific to the external speaker.

9. An information handling system (IHS) comprising:

a processor:

an external speaker coupled to the IHS; and a memory component coupled to the processor, wherein the the memory component comprises a set of instructions, wherein execution of the set of instructions by the processor causes the processor to receive a device identifier (ID) associated with the external speaker, determine the presence of a custom audio driver associated with the external speaker, if the custom audio driver is present, load, without input of a user, the custom audio driver associated with the external speaker, wherein the custom audio driver contains a speaker compensation parameter associated with the external speaker, and if the custom audio driver is not present load, without input of the user a generic audio driver, and load within the generic audio driver the speaker compensation parameter.

10. The system of claim 9, wherein the OS is further operable to filter audio data sent to the external speaker by applying a speaker compensation parameter associated with the custom driver or generic driver loaded.

11. The system of claim 9 further comprising a network coupled to the IHS and the external speaker.

12. The system of claim 11 further comprising a stream manager operable to facilitate communication between the IHS and the external speaker through the network, and wherein the stream manager is further operable to identify the external speaker to the IHS.

13. The system of claim 9, wherein the custom audio driver comprises the speaker compensation parameter, wherein the speaker compensation parameter is specific to the external speaker.

14. The system of claim 10 further comprising a database located on the IHS, the database operable to store a plurality of compensation parameters, and wherein the speaker compensation parameter is stored on the database.

15. The system of claim 14, wherein the IHS is operable to load the speaker compensation parameter from the database and apply the speaker compensation parameter with the generic audio driver to filter the audio data, wherein the speaker compensation parameter is specific to the external speaker.

16. A method for managing an external speaker coupled to an information handling system (IHS), the method comprising:

initializing the IHS and an external speaker, the external speaker coupled to the IHS via a direct connection;

identifying the external speaker to the IHS;

determining presence of a custom audio driver associated with the external speaker;

if the custom audio driver is present, loading the custom audio driver, without input of a user, for the external speaker upon identifying the external speaker, wherein the custom audio driver comprises a speaker compensation parameter specific to the external speaker;

if the custom audio driver is not present, loading a generic audio driver, without input of a user, and loading the speaker compensation parameter within the generic audio driver; and filtering audio data sent to the external speaker by applying the speaker compensation parameter to the audio data.

17. The method of claim 16, wherein the direct connection occurs via a Universal Serial Bus connection, a Bluetooth connection, or a UWB connection.

18. The method of claim 16, wherein the external speaker is coupled to the IHS through a network via a stream manager, the stream manager operable to identify the external speaker to the IHS.

19. The method of claim 4, wherein the stream manager identifies the external speaker to the IHS through an enumeration process.

* * * * *